No. 819,337. PATENTED MAY 1, 1906.
S. S. CHILDS & W. CHILDS, Jr.
VEHICLE WHEEL.
APPLICATION FILED AUG. 22, 1905.

3 SHEETS—SHEET 1.

WITNESSES:
Ralph Lancaster
M. V. Doyle.

INVENTORS:—
Samuel S. Childs
William Childs, Jr.
BY
Charles N. Peel,
ATTORNEY.

No. 819,337. PATENTED MAY 1, 1906.
S. S. CHILDS & W. CHILDS, Jr.
VEHICLE WHEEL.
APPLICATION FILED AUG. 22, 1905.

3 SHEETS—SHEET 2.

WITNESSES:

INVENTORS:

No. 819,337. PATENTED MAY 1, 1906.
S. S. CHILDS & W. CHILDS, Jr.
VEHICLE WHEEL.
APPLICATION FILED AUG. 22, 1905.
3 SHEETS—SHEET 3.
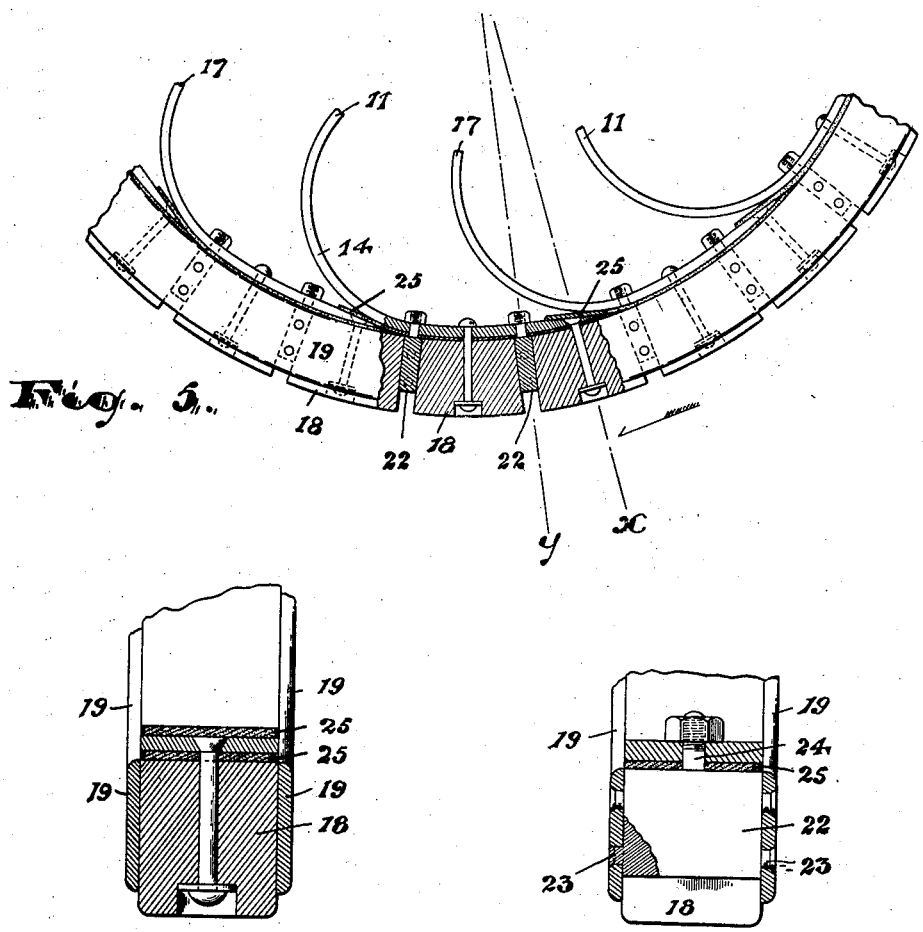
WITNESSES: INVENTORS:
Ralph Lancaster Samuel S. Childs,
M. V. Doyle William Childs, Jr.
BY
Charles H. Pell atty.

UNITED STATES PATENT OFFICE.

SAMUEL S. CHILDS AND WILLIAM CHILDS, JR., OF BERNARDSVILLE, NEW JERSEY.

VEHICLE-WHEEL.

No. 819,337.	Specification of Letters Patent.	Patented May 1, 1906.

Application filed August 22, 1905. Serial No. 275,219.

*To all whom it may concern:*

Be it known that we, SAMUEL S. CHILDS and WILLIAM CHILDS, Jr., citizens of the United States, residing at Bernardsville, in the county of Somerset and State of New Jersey, have invented certain new and useful Improvements in Vehicle-Wheels; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to provide an automobile or other vehicle wheel which while having the elasticity common to wheels having pneumatic tires will be more durable and of a reduced cost of construction; to enable said wheels to be easily and quickly repaired in the event of breakage; to avoid punctures and the other inconveniences incident to the use of pneumatic tires, and to secure other general and specific advantages and results, some of which may be hereinafter referred to in connection with the description of the working parts.

Figure 1:
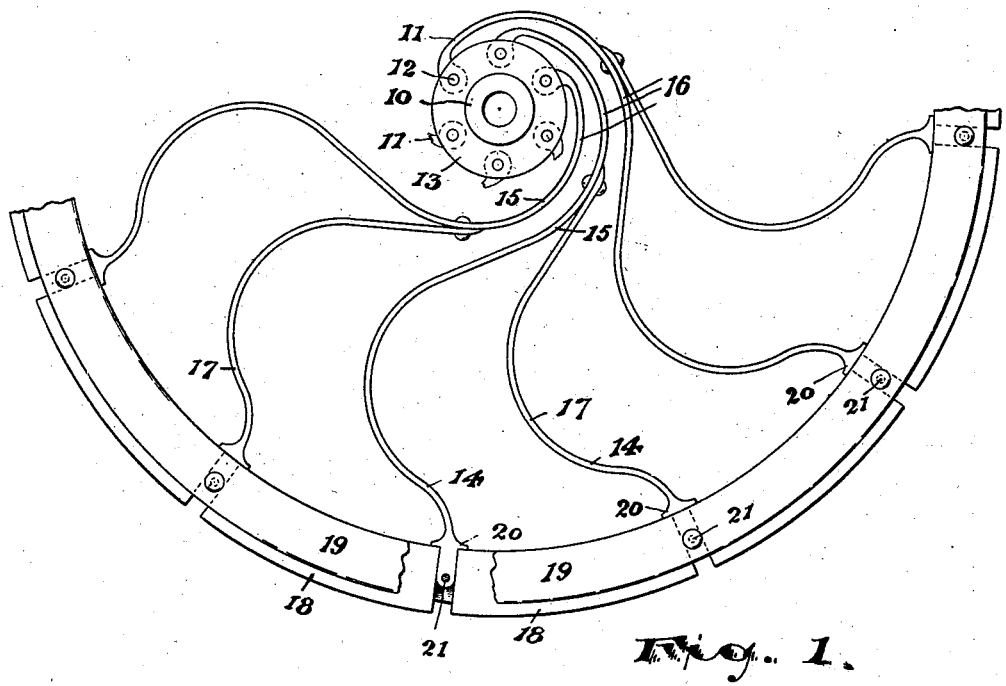
Figure 2:
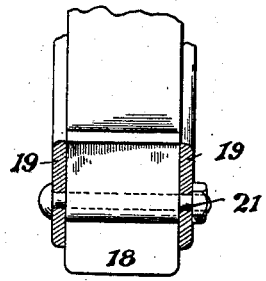
Figure 3:
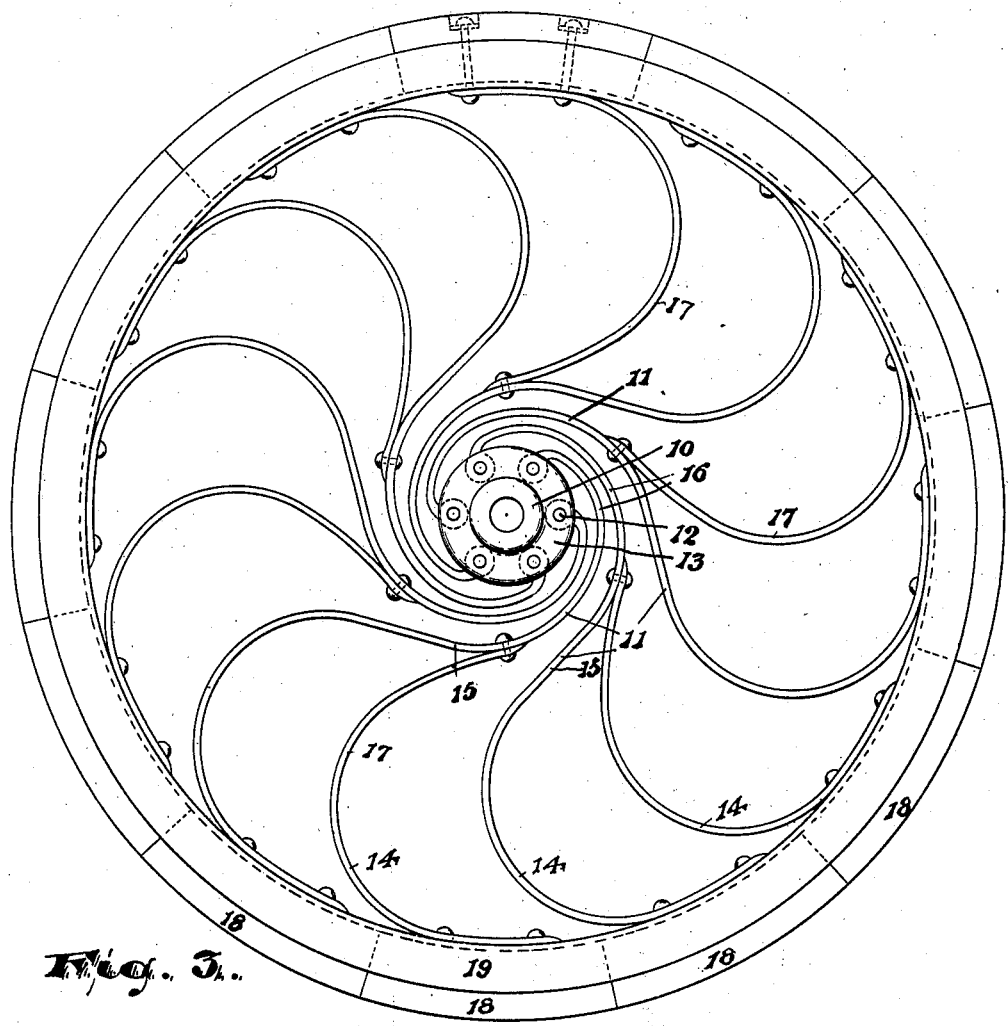
Figure 4:
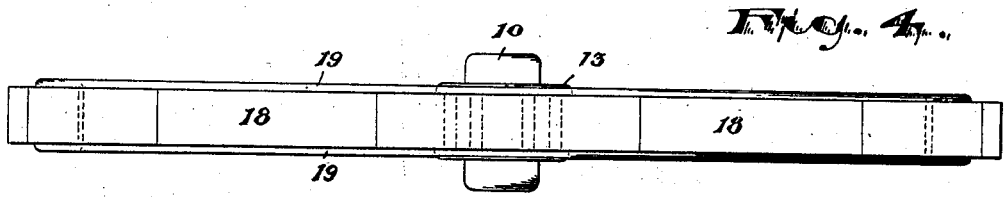

Referring to the accompanying drawings, in which like figures of reference indicate corresponding parts in each of the several figures, Figure 1 is a side elevation of a portion of a wheel of our improved construction. Fig. 2 is a detail section of the same on an enlarged scale.
Fig. 3 is a side elevation of our wheel, showing a variation of construction; and Fig. 4 is an edge view of the same. Fig. 5 is another side elevation, partly in section, of a portion of our wheel, showing another variation of construction; and Figs. 6 and 7 are sectional views on lines $x$ and $y$, respectively.

In said drawings, 10 indicates the hub of the wheel, which is preferably a metal hub having peripheral side flanges 13, between which the resilient spokes 11 are secured. Said spokes are perforated at their inner extremities to receive the bolts or rivets 12, said bolts 12 extending through said flanges 13 and perforated springs 11 to hold the latter securely in connection with the hub. Said resilient spokes 11 have an ogee curve, the opposite ends having contrasting curves and projecting oppositely in some resemblance to the letter S, so that the lower spokes of the wheel when the wheel stands in a vertical plane, as usual, extend up from the rim or tire, curving, as at 14, first to one side of the vertical axial line of the wheel, and then, as at 15, crossing said axial line and winding to one side of the hub, as at 16, and are attached to said hub at the upper side of said hub by the bolts, as hereinbefore described, or by other means, as shown in Figs. 1 and 3. Thus the hub of the wheel has a suspensory relation to the springs, serving as spokes, which support it, and the springs can thus be made of considerable length, conducing to increased elasticity. Said spokes 11 are reinforced by supplementary spokes 17, which are also curved laterally from and then toward an axial line of the wheel in resemblance to the springs 11; but these approach and then contact with the spokes 11 at points distant from the points of connection of said spring-spokes 11 with the hub, as shown, and are riveted to said spokes to reinforce and strengthen the same. The spokes 11 and the short reinforcing or supplementary spokes 17 alternate, and the outer extremities of the alternating spokes and supplemental spokes are preferably equidistant in series at the rim or tire of the wheel. Said spokes 11 and supplementary spokes 17 are preferably fastened to the rim or tire in the manner shown in Figs. 1 and 2, where 18 18 18 indicate a series of segmental blocks of wood, preferably having a wedge form and having the grain radiate or approximately radiate from the hub, so as to have an endwise bearing on the ground or road-bed. These blocks are preferably clamped between annular side plates 19 19, lying against the sides of said blocks and between the adjacent ends of said blocks 18 18. The flat outer ends of the spokes 11 and supplementary spokes 17 preferably extend as shown in Fig. 1, the spokes, which are also flat or leaf springs, having shoulders 20 formed thereon at or near the inner side of the blocks or rim, by which the blocks may be held in position when subjected to pressure. In this form of construction the side plates, spokes, and blocks of wood are firmly held together by bolts or rivets 21, which extend through perforations in said side plates and in the ends of the spokes, as indicated in Fig. 2. In certain cases we may independently fasten the spokes and supplemental spokes against the inner surfaces of the blocks, the springs being curved to lie parallel with said inner surfaces and against the same, as in Fig. 3, and the springs thus curved may be extended in length and beveled or reduced, as in Fig. 5, so that one spring is locked underneath the spring next in series, and in this case the springs may be fastened to blocks by bolts independent of the means for fastening the side plates.

In the construction shown in Figs. 5, 6, and 7 the wooden blocks are held apart by plates 22, having integral lugs 23 24, which may be provided with screw-threads or be upset to form rivet-heads, the latter construction being preferably employed where said lugs serve in fastening the side plates in place. Where there is a danger of one spring coming into contact with another spring during the progress of the vehicle, I have provided intermediate washers or cushions 25, of leather or similar non-sonorous material, adapted to prevent rattling or other sound, due to metallic contact.

In thus describing a plurality of modifications we do not wish to be understood as having described all the modifications we have conceived of, but it is throught to be unnecessary to detail further such modifications.

While we prefer to make the tire of wooden sections segmental in shape with the grain of the wood running transverse to the longitude of said sections, so that said grain when the blocks are in the wheel will lie parallel or approximately parallel with the radii of the wheel-axis, yet other material may be employed to advantage, such as blocks of rubber or a composition containing rubber. The blocks present a cushion-like body to the pavements or road-bed, and thus deaden vibration and render riding in the vehicle more comfortable and pleasant. By having the grain of the wood run in the direction described in the wheel the durability of the tread-surface is materially increased.

Having thus described the invention, what we claim as new is—

1. A wheel comprising a hub, a rim, and a series of ogee curved spokes, each spoke being secured at one end to the hub at a point in the hub's periphery, and attached at its other end to the rim at a point approximately diametrically opposite to the point of attachment to the hub.

2. A wheel comprising a hub, a rim, and series of springs of an ogee shape fastened to the hub and the rim on opposite sides of the center of the wheel.

3. A wheel comprising a hub, a rim, a series of springs of an ogee shape fastened to the hub and the rim on opposite sides of the center of the wheel, and a second series of springs attached to the rim and to the ogee springs.

4. A wheel comprising a hub, a rim, and a series of spring-spokes, each spoke having one end secured to the hub, and the spoke winding part way around the hub at a distance therefrom and then passing in a reverse curve and being secured to the rim at a point diametrically opposite the attachment to the hub.

5. The combination with the flanged hub and rim or tire consisting of a series of blocks joined together, of a series of resilient spokes having ogee curves, one end of each of which is fastened to the hub between the flanges thereof and the other end of each of which extends between the said blocks, and means for fastening the blocks and spokes together.

6. The combination with the hub and rim or tire consisting of a series of blocks joined together, of a series of resilient spokes having ogee curves, one end of each of which is fastened to the hub and the other end of each of which extends between the said blocks, and means for fastening the blocks and spokes together.

7. The combination with the hub and a rim or tire composed of segmental blocks, of a series of curved springs connecting said hub and rim or tire, and supplemental springs reinforcing said connecting-springs, substantially as set forth.

In testimony that we claim the foregoing we have hereunto set our hands this 17th day of August, 1905.

SAMUEL S. CHILDS.
WILLIAM CHILDS, JR.

Witnesses:
CHARLES H. PELL,
M. V. DOYLE.